(12) United States Patent
Natrajan et al.

(10) Patent No.: US 8,689,044 B2
(45) Date of Patent: Apr. 1, 2014

(54) SAS HOST CONTROLLER CACHE TRACKING

(75) Inventors: Balaji Natrajan, Spring, TX (US); Michael G Myrah, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 261 days.

(21) Appl. No.: 13/298,099

(22) Filed: Nov. 16, 2011

(65) Prior Publication Data

US 2013/0124801 A1    May 16, 2013

(51) Int. Cl.
*G06F 11/00* (2006.01)

(52) U.S. Cl.
USPC ........................................... 714/6.3

(58) Field of Classification Search
USPC ..................... 714/6.3, 6.31, 6.32
See application file for complete search history.

(56) References Cited

U.S. PATENT DOCUMENTS

| | | | |
|---|---|---|---|
| 6,681,339 B2 * | 1/2004 | McKean et al. .............. | 714/5.11 |
| 6,725,397 B1 | 4/2004 | Emberty et al. | |
| 6,757,790 B2 | 6/2004 | Chalmer et al. | |
| 7,366,846 B2 * | 4/2008 | Boyd et al. .................... | 711/144 |
| 7,676,702 B2 | 3/2010 | Basham et al. | |
| 7,853,961 B2 * | 12/2010 | Nori et al. ..................... | 719/328 |
| 7,975,169 B2 | 7/2011 | Ash et al. | |
| 2004/0268037 A1 * | 12/2004 | Buchanan et al. ............. | 711/114 |
| 2005/0102549 A1 * | 5/2005 | Davies et al. ..................... | 714/4 |
| 2005/0210317 A1 * | 9/2005 | Thorpe et al. ..................... | 714/6 |
| 2007/0083707 A1 * | 4/2007 | Holland et al. ............... | 711/114 |
| 2008/0040552 A1 * | 2/2008 | Tsuiji et al. .................. | 711/131 |
| 2010/0180065 A1 | 7/2010 | Cherian et al. | |
| 2012/0054441 A1 * | 3/2012 | Nakashima et al. .......... | 711/124 |
| 2012/0144082 A1 * | 6/2012 | Romero et al. ............... | 710/300 |

FOREIGN PATENT DOCUMENTS

WO    WO 2010/037147    4/2010

* cited by examiner

*Primary Examiner* — Yolanda L Wilson
(74) *Attorney, Agent, or Firm* — Arthur S. Ortega

(57) ABSTRACT

A technique to track a host controller cache that includes receiving from a host controller a command indicating whether a cache of the host controller has data which is to be stored to a storage system. In the event that the host controller fails, perform an operation to transfer control from the host controller to another host controller based on whether the command indicates that the data of the cache was stored to the storage system.

20 Claims, 3 Drawing Sheets

SAS HOST CONTROLLER CACHE TRACKING

BACKGROUND

Serial attached small computer system interface (SAS) is a communications protocol for enabling communications between computer devices. In the SAS protocol, SAS devices include initiator devices, target devices, and expander devices. Initiator devices are devices that can begin a SAS data transfer, while target devices are devices to which initiator devices can transfer data. Expander devices are devices that can facilitate data transfer between multiple initiator devices and multiple target devices. The SAS protocol utilizes a point-to-point bus topology. Therefore, if an initiator device is required to connect to multiple target devices, a direct connection can be established between the initiator device and each individual target device to facilitate each individual data transfer between the initiator device and each individual target device. Expander devices can manage the connections and data transfer between multiple initiator devices and multiple target devices. A SAS fabric can include a network of initiator devices, target devices and expander devices.

BRIEF DESCRIPTION OF THE DRAWINGS

Certain examples are described in the following detailed description and in reference to the drawings, in which.

DETAILED DESCRIPTION OF SPECIFIC EXAMPLES

This present application describes techniques in which a SAS device, such as a SAS expander, can have information indicating whether data in a cache of a host controller has been flushed to storage at the point in time when the host fails. The SAS expander can use this cache state information to determine whether it can safely zone storage that is assigned to a failed host over to a replacement host. If there is data trapped in the cache that has not been flushed to storage, then storage data may be potentially inconsistent which may make it difficult to perform a failover operation including to zone the storage from the failed host over to a replacement host. The present techniques may allow a host and a SAS expander to determine whether there is data trapped in the host controller cache at the point the host fails. These techniques may have advantages. For example, employing SAS fabric based solutions with host failover using SAS zoning may allow data to be transferred to a replacement host in a more efficient manner compared to transferring data over an Ethernet fabric.

As explained above, a SAS fabric can include a network of initiator devices, target devices and expander devices. In one example, a SAS fabric can include a SAS expander coupled to initiators such as hosts and to targets such as storage from a storage system. The hosts may include host controllers and corresponding host cache to store data for future requests by the host controllers. In the event of a host controller failure, the expander can perform a failover operation that may include transferring control from the failed host controller over to a replacement host controller. Before the expander can perform such a transfer, any data in the cache of the failed host controller may need to be flushed (transferred or stored) to corresponding storage of the storage system. The present application may provide techniques to allow the expander to track cache state information of the host controller including whether the data in the cache has been flushed to the storage system. This information may help the expander to decide whether to perform a failover from the failed host controller to another host controller, as explained below in further detail.

Figure 1:
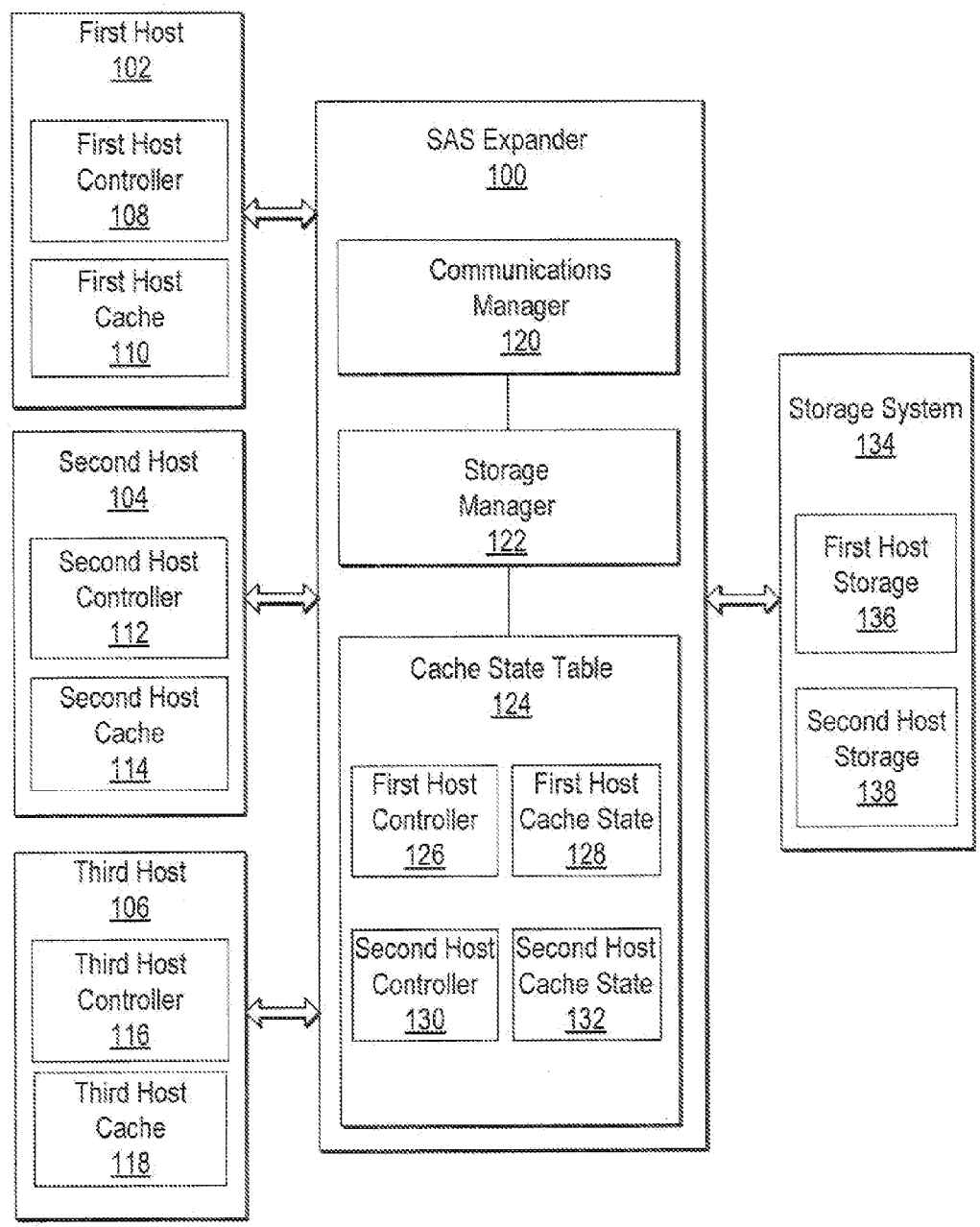
FIG. 1 is an example block diagram of a SAS expander to track host controller cache.

FIG. 1 is an example block diagram of a SAS fabric for tracking host controller cache. The SAS fabric may include a network of SAS protocol enabled devices including a SAS expander 100 capable of allowing communication between a plurality of SAS initiators such as first host 102, second host 104, third host 106 and a SAS target such as storage system 134. The hosts 102, 104, 106 include respective host controllers 108, 112, 116 and respective caches 110, 114, 118. The SAS expander 100 includes a communications manager 120 which can receive from host controllers 108, 112, 116 cache state commands indicating whether respective caches 110, 114, 118 contain data that may need to be flushed (transferred or stored) to storage system 134. The SAS expander 100 includes a cache state table 124 which can be used to store cache state information including the state of the respective caches of host controllers and address information of the respective host controllers. The SAS expander 100 includes a storage manager 122 which, in the event that a particular host controller fails, can perform an operation to transfer control from the failed host controller to another host controller (replacement host controller) based on information from cache state table 124 indicating whether the data of the cache was flushed to storage system 134.

The first host 102 can include a SAS enabled data processing device capable of communicating over a SAS fabric. The first host 102 can include any data processing device such as a server computer, personal computer and the like. The first host controller 108 can provide processing functionality to support first host 102. For example, first host controller 108 can include an array controller for managing storage arrays. The first host cache 110 can include memory to store data that is frequently used by the first host controller. In one example, first host 102 can be an initiator capable of generating multiple commands sent to SAS expander 100 and directed to storage resources associated with multiple targets. For example, first host controller 108 can be assigned (zoned) storage resources such as first host storage 136 from storage system 134. Once storage is assigned, first host controller 108 can generate and send to SAS expander 100 commands to store data and retrieve data from first host storage 136. In another example, first host 102 can comprise a plurality of server computers with array controllers to enable the servers to access and communicate with other devices on the SAS fabric. The array controllers can comprise storage controllers such as disk array controllers which can manage physical disk drives and present them to the servers as logical units. In some examples, array controllers can implement redundant array of independent disk (RAID) functionality and may be referred to as RAID controllers. The functionality of second host 104 and third host 106 and its respective components is similar to that of first host 102 as described herein.

In one example, first host 102 and second host 104 can be configured to be in an active mode which can be defined as a mode in which the host is powered on and ready to communicate with SAS expander 100. On the other hand, third host 106 can be configured to be in a standby mode which can be defined as a mode in which the host is not powered on but is configured to be used as a replacement host. The replacement host can be used by the SAS expander to perform a failover operation and transfer control from a failed host controller to the replacement host controller. It should be understood that this configuration is for illustrative purposes and other arrangements are possible. For example, the SAS fabric can include first host in the active mode and second host in the standby mode or other combinations thereof. Three hosts 102, 104, 106 are shown in communication with SAS expander 100. However, it should be understood that a different number of hosts can be in communication with SAS expander 100. The hosts 102, 104, 106 are shown as having a single host controller and host cache. However, it should be understood that hosts 102, 104, 106 can be configured with a plurality of host controllers and host caches.

The SAS expander 100 is shown in communication with a SAS target such as storage system 134. The storage system 134 may include any data processing device capable of managing storage resources with functionality for storage of data and for subsequent retrieval by initiators such as hosts 102, 104, 106. The storage system 134 may include storage drive bays which may contain storage drives, such as disk drives, solid state drives, optical drives, tape drives, and the like. In the example shown in FIG. 1, SAS expander 100 has assigned a first zone group comprising first host storage 136 to first host controller 108 and assigned a second zone group comprising second host storage 138 to second host controller 112. However, SAS expander 100 has not assigned a zone group to third host 106 because the third host is configured to be in the standby mode and ready for use as a replacement host. It should be understood that other storage zone group assignments and configurations may be possible.

The communications manager 120 can provide an interface for communicating with SAS devices over the SAS fabric. For example, communications manager 120 can provide an interface to communicate with SAS initiator devices such as hosts 102, 104, 106. The communications manager 120 can also provide an interface to communicate with SAS target devices such as storage system 134. For example, communications manager 120 can exchange data and commands with hosts 102, 104, 106 and with storage system 134. The communications manager 120 can interface with SAS expander 100 PHYs which are specific to the SAS protocol and can represent physical devices for communication. The SAS expander 100 can include a plurality of ports associated with PHYs which can comprise electronic-transceivers for exchanging data and requests or commands between the expander and hosts 102, 104,106 and storage system 134. A SAS port associated with a single PHY is referred to as a narrow port whereas a SAS port associated with two or more PHYs is referred to as a wide port.

A SAS port can be associated with a unique SAS address. In one example, SAS expander 100 may be assigned its own unique SAS address. The storage system 134 may include storage components such as hard disk drives and each of these components may be assigned its own unique SAS address. Likewise, host controllers 108, 112, 116 may be assigned its own unique SAS address. The SAS unique address assigned to SAS expander 100, storage system 134 and host controllers 108, 112, 116 may allow these devices to be uniquely identified and allow them to communicate with the SAS expander. In another example, a host controller may have multiple ports and each port may be assigned a unique SAS address. For ease of illustration, host controllers 108, 112, 116 include a single SAS port and are assigned a single unique SAS address.

The storage manager 122 can assign portions of storage system 134 to hosts 102, 104, 106. For example, storage manager 122 can assign first host storage 136 to a first zone group and then assign that zone group to first host 102 to thereby provide the first host with access to the first host storage. In a similar manner, storage manager 122 can assign second host storage 138 to a second zone group and then assign that zone group to second host 104 to thereby provide the second host with access to the second host storage. As explained above, first host 102 and second host 104 are configured to be in active mode and therefore are assigned storage. However, third host 106 is configured to be in standby mode and therefore is not assigned storage from storage system 134. In this manner, storage manager 122 can perform a failover operation by transferring control from a failed host, such as first host 102 or second host 104, to third host 106 in case the first or second host experience a failure. A host failure can include a condition such as when the host is no longer communicating with SAS expander 100, is offline or any other condition in which the host is no longer operational. A failover operation can include assigning the zone group associated with a failed host controller, such as first host controller 108, to a replacement host controller such as third host controller 116. In this manner, first host controller 108 can be replaced by third host controller 116 which can then access first host storage 136 which was previously assigned to the first host controller.

The storage manager 122 can manage cache state table 124 to track the state of the cache of the host controller for failover operation. For example, as explained above, first host 102 and second host 104 may be configured to be in the active mode and have respective cache state information stored in cache state table 124. Further, first host storage 136 may be assigned to a zone group associated with first host 102 and second host storage 138 may be assigned to a zone group associated with second host 104. The third host 106 may be configured in standby mode and is not assigned to a zone group of storage of storage system 134. In the case of third host 106, SAS expander 100 does not store cache state information in cache state table 124. As explained below in further detail, SAS expander 100 is capable of performing a failover operation by transferring control from a failed host, such as first host 102 or second host 104, to a replacement host, such as third host 106 based on information from cache state table 124.

The communications manager 120 can receive commands from host controllers indicating whether the cache of the host controllers have data to be flushed to storage system 134. For example, to illustrate, first host controller 108 can save data to first host cache 110 and then generate a cache state command having a state of DIRTY indicating that the first host cache contains data which has not been flushed to first host storage 136. In another example, second host controller 112, which may have previously saved data to second host cache 114, can flush the data from the second host cache to second host storage 138. In this case, second host controller 112 can then send to communications manager 120 a cache state command having a state of CLEAN indicating that second host cache 114 has flushed its data to second host storage 138. The storage manager 122 can use the information from the commands to form the cache state information related to first host cache 110 and second host cache 114 into corresponding entries in cache state table 124. Further, cache state table 124 includes entries (first host controller 126 and second host controller 130) with information identifying the host controllers such as the SAS addresses of the host controllers. The storage manager 122 can perform standard SAS discovery process to identify SAS devices on the SAS fabric such as hosts 102, 104, 106 and storage system 134. The discovery process can provide SAS address information of these devices which can be stored in the relevant cache table address entry of cache state table 124.

The storage manager 122 can be configured to check whether a host controller has failed. For example, to illustrate, first host controller 108 and second host controller 112 can fail and storage manager 122 can detect these failures. In one example, storage manager 122 can receive a signal indicating that a host has failed. In one example, storage manager 122 can use a heart beat mechanism to detect a host failure condition. The heart beat mechanism may operate by having the storage manger 122 send a signal to the host and expect a response within a certain period of time. If no response is received within the certain period of time, then a host failure condition may be assumed.

In the event of a host controller failure, storage manager 122 can perform an operation to transfer control from the host controller that failed to a replacement host controller based on whether cache state information of the respective host controller indicates that the data of the cache was stored to storage system. To illustrate, continuing with the above example, storage manager 122 can detect that first host controller 108 failed. The storage manager 122 can then check cache state table 124 for the cache state information corresponding to first host controller 108. In particular, storage manager 122 can check first host cache state 128 which has a state of DIRTY indicating that first host cache 110 contains data which has not been flushed or transferred to first host storage 136. In this case, storage manager 122 may not be able to automatically transfer controller from first host controller 108 to a replacement host controller such as third host controller 116. That is, because first host cache 110 contains data which was not flushed to first host storage 136, storage manager 122 may not be able to assign the storage zone group associated with first host storage 136 from first host 102 to third host 106. Instead, storage manager 122 may provide a user with information or an alert message indicating that first host controller has failed and that a transfer of control or failover to another host controller was not successful. In this case, in one example, a failover operation may require manual intervention including having a user physically remove the cache from the failed host and transfer it to a replacement host such as third host 106.

Continuing with the example above, storage manager 122 can detect that second host controller 112 failed. The storage manager 122 can then proceed to check cache state table 124 for the cache state information corresponding to second host controller 112. In particular, storage manager 122 can check second host cache state 132 which has a state of CLEAN indicating that second host cache 114 has data which was flushed or transferred its cached data to second host storage 138. In this case, SAS expander 100 can proceed to automatically transfer control from second host controller 112 to third host controller 116. That is, because second host cache 114 contains data which was flushed to second host storage 138, storage manager 122 may be able to safely assign the storage zone group associated with second host storage 138 from second host 104 to third host 106. In addition, storage manager 122 can provide a user with information or message indicating that second host controller 112 has failed and that a transfer of control or failover to third host controller 116 was successful.

The configuration of the SAS fabric of FIG. 1 is for illustrative purposes and it should be understood that a different configuration can be employed to implement the techniques of the present application. For example, the functionality of communications manager 120 and storage manager 122 are shown as part of SAS expander 100, however, it should be understood that other configurations may be possible. To illustrate, in one example, the functionality of communications manager 120 can be combined with that of storage manager 122. In another example, the functionality of communications manager 120 and storage manager 122 can be distributed among a plurality of devices located locally, remotely or a combination thereof. The functionality of SAS expander 100 and its components can be implemented in hardware, software, or a combination thereof. The techniques of the present application are show in a SAS fabric architecture, however, it should be understood that the techniques of the present application can be applicable in other architectures such as Storage Area Networks (SAN), Direct Attached Networks (DAN) or other network architectures. FIG. 1 shows SAS expander 100 as providing functionality for tracking host controller cache and managing failover operation. However, it should be understood that other SAS enabled devices can be used to perform this functionally. For example, a SAS switch can be used which may include a chassis with management devices and one or more SAS expanders.

Figure 2:
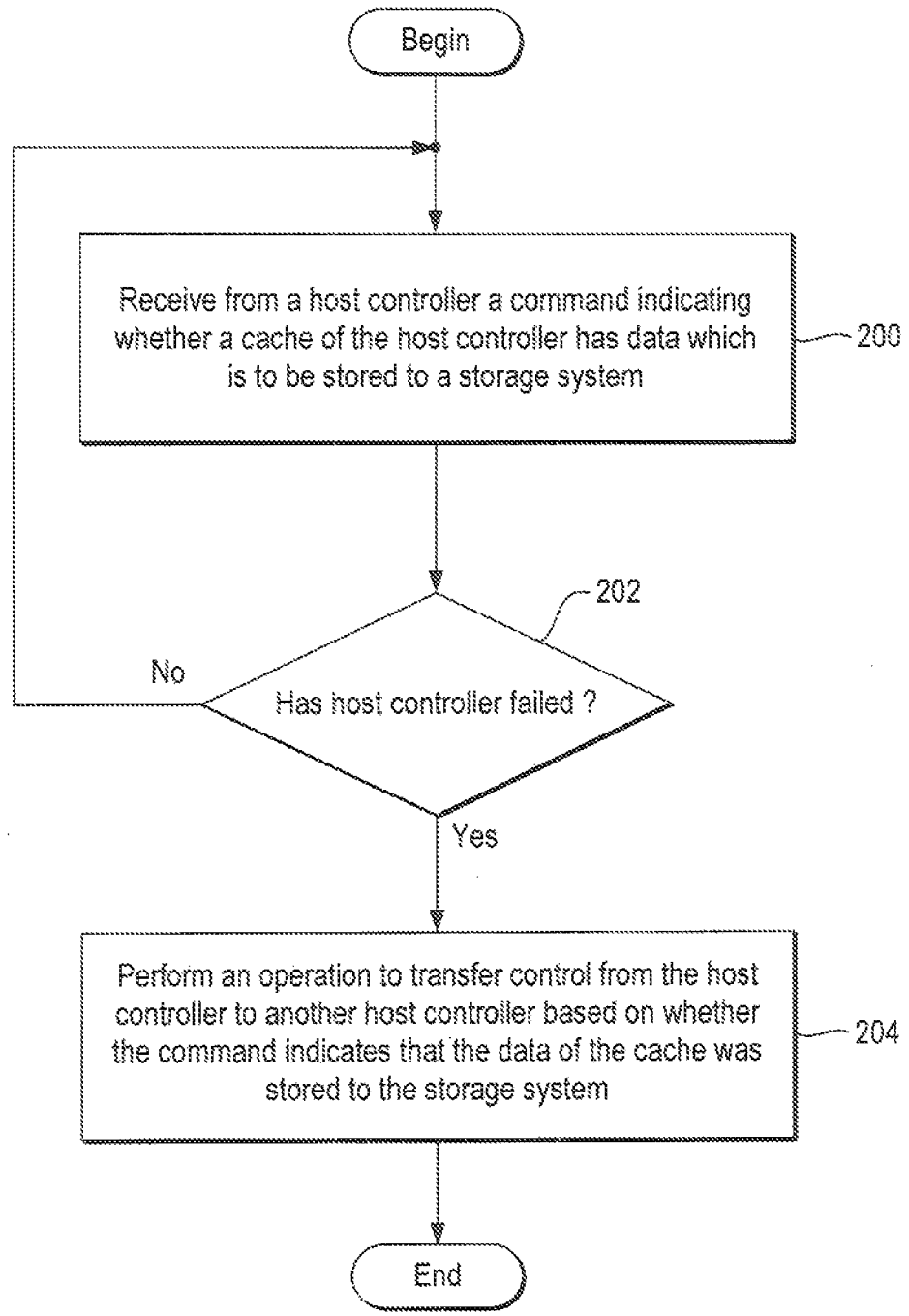
FIG. 2 is an example process flow diagram of a method of tracking host controller cache.

FIG. 2 is an example process flow diagram of a method of operating SAS expander 100 to track the cache of host controllers.

To illustrate, in one example, it will be assumed that first host 102, second host 104 and third host 106 are coupled to SAS expander 100 as shown in FIG. 1. Further, it can be assumed that first host 102 and second host 104 are configured in the active mode and have respective cache state information stored in cache state table 124. Further, it can be assumed that first host storage 136 is assigned to a zone group associated with first host 102 and that second host storage 138 is assigned to a zone group associated with second host 104. It can be further assumed that third host 106 is configured in standby mode and that it is not assigned to a zone group of storage from storage system 134. In the case of third host 106, SAS expander 100 does not store cache state information in cache state table 124 for the third host. As explained below in further detail, SAS expander 100 is capable of performing a failover operation by transferring control from first host 102 or second host 104 to third host 106 based on information from cache state table 124.

The method may begin at block 200, where SAS expander 100 receives from a host controller a command indicating whether a cache of the host controller has data to be stored (flushed) to a storage system. For example, to illustrate, it can be assumed that first host controller 108 saves data to first host cache 110 as a result of accessing first host storage 136. Then, first host controller 108 sends to SAS expander 100 a cache state command having a state of DIRTY indicating that first host cache 110 contains data which has not been flushed or transferred to first host storage 136. In addition, to illustrate, it can be assumed that second host controller 112 had previously saved data to second host cache 114 and now flushes or transfer the data to second host storage 138. In this case, second host controller 112 can then send to SAS expander 100 a cache state command having a state of CLEAN indicating that second host cache 114 contains data which has been flushed or transferred to second host storage 138. The SAS expander 100 can store the information from the commands as cache state information related to first host cache 110 and second host cache 114 into the corresponding entries of cache state table 124. Processing can proceed to block 202 where SAS expander 100 can check whether a host controller has failed.

At block 202, SAS expander 100 can check whether a host controller has failed. For example, to illustrate, it can be assumed that first host controller 108 has failed and that SAS expander can detect this failure. It can also be assumed that second host controller 112 has failed and that SAS expander 100 can detect this failure. As explained above, SAS expander 100 can detect failure of a host controller using a heart beat mechanism, for example. In this case, in the event of host controller failure, processing can proceed to block 204 where SAS expander can further process this failure condition. On the other hand, if there was no host controller failure, then processing would proceed back to block 200 where SAS expander would continue to receive cache state commands from host controllers.

At block 204, SAS expander 100 can perform an operation to transfer control from the host controller that failed to another host controller based on whether the cache state information in cache state table 124 indicates that the data of the cache was flushed to storage system. To illustrate, continuing with the above example, SAS expander 100 detected that first host controller 108 failed. The storage manager 122 can then check cache state table 124 for the cache state information corresponding to first host controller 108. In particular, storage manager 122 can check first host cache state 128 which has a state of DIRTY indicating that first host cache 110 contains data which has not been flushed or transferred to first host storage 136. In this case, SAS expander 100 may not be able to automatically transfer control from first host controller 108 to third host controller 116. That is, because first host cache 110 contains data which was not flushed to first host storage 136, SAS expander 100 may not be able to assign the storage zone group associated with first host storage 136 from first host 102 to third host 106. Instead, SAS expander may provide a user with information or message indicating that first host controller has failed and that a transfer of control or failover to another host controller was not successful. In this case, in one example, a failover operation may require manual intervention including having a user physically remove the cache from the failed host and transfer it to a replacement host such as third host which is in the standby mode.

Continuing with the example above, SAS expander 100 detected that that second host controller 112 failed. The storage manager 122 can then proceed to check cache state table 124 for the cache state information corresponding to second host controller 112. In particular, storage manager 122 can check second host cache state 132 which has a state of CLEAN indicating that second host cache 114 has flushed or transferred its data to second host storage 138. In this case, SAS expander 100 can proceed to automatically transfer control from second host controller 112 to third host controller 116. That is, because second host cache 114 contains data which was flushed to second host storage 138, SAS expander 100 may be able to safely assign the storage zone group associated with second host storage 138 from second host 104 to third host 106. In addition, SAS expander 100 can provide a user with information or a message indicating that second host controller 112 has failed and that a transfer of control or failover to third host controller 116 was successful. Although not shown, in one example, processing can proceed back to block 200 to have SAS expander 100 continue to receive cache state commands from host controllers coupled to the expander.

The above method describes an example of operation, however, it should be understood that the present techniques can be employed with other configurations and examples. For example, the above illustrates failure of both first host controller 108 and second host controller 112. However, it should be understood that the techniques of the present application can be employed in other scenarios such as if only first host controller 108 failed or if only second host controller 112 failed.

Figure 3:
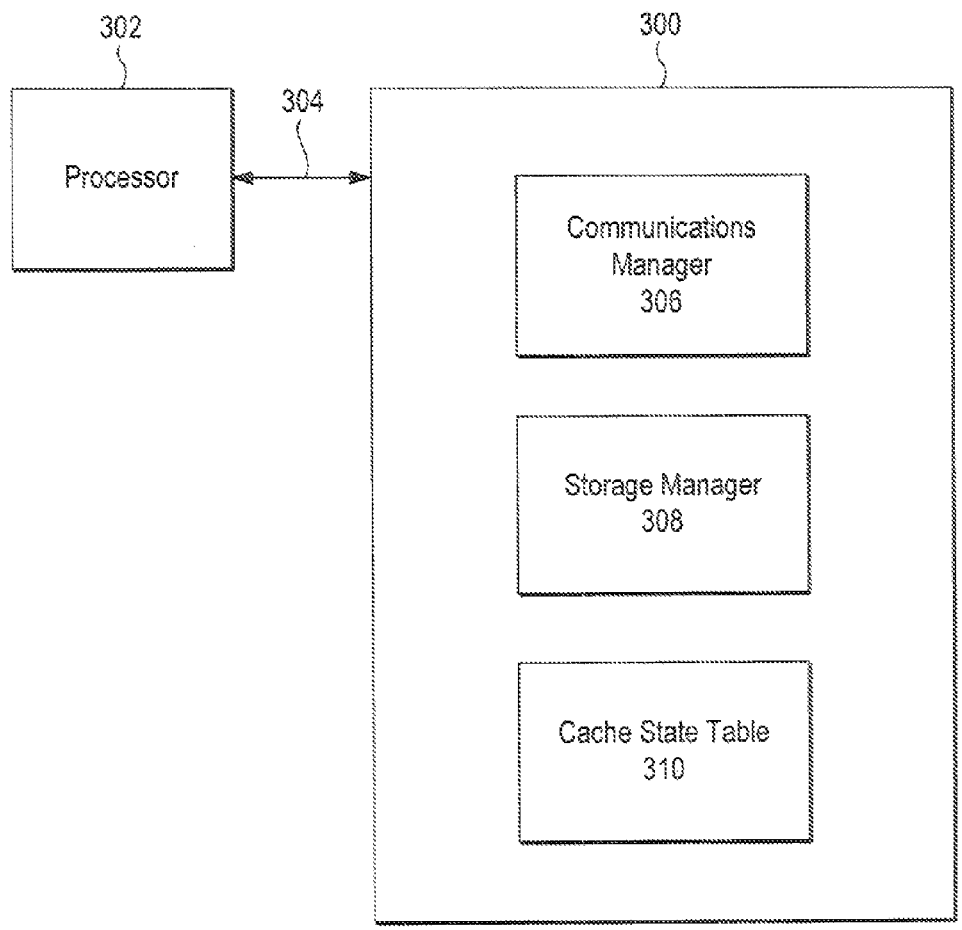
FIG. 3 is an example block diagram showing a non-transitory, computer-readable medium that stores instructions for tracking host controller cache.

FIG. 3 is an example block diagram showing a non-transitory, computer-readable medium that stores code for operating a SAS expander. The non-transitory, computer-readable medium is generally referred to by the reference number 300 and may be included in SAS expander 100 of the SAS fabric described in relation to FIG. 1. The non-transitory, computer-readable medium 300 may correspond to any typical storage device that stores computer-implemented instructions, such as programming code or the like. For example, the non-transitory, computer-readable medium 300 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

A processor 302 generally retrieves and executes the instructions stored in the non-transitory, computer-readable medium 300 to operate the SAS expander in accordance with an example. In an example, the tangible, machine-readable medium 300 can be accessed by the processor 302 over a bus 304. A first region 306 of the non-transitory, computer-readable medium 300 may include communications manager 120 functionality as described herein. A second region 308 of the non-transitory, computer-readable medium 300 may include storage manager 122 functionality as described herein. A third region 310 of the non-transitory, computer-readable medium 300 may include cache state table 124 structure and functionality as described herein.

Although shown as contiguous blocks, the software components can be stored in any order or configuration. For example, if the non-transitory, computer-readable medium 300 is a hard drive, the software components can be stored in non-contiguous, or even overlapping, sectors.

What is claimed is:

1. A SAS expander to track host controller cache comprising:
   a communications manager to receive from a host controller a command indicating whether a cache of the host controller has data to be stored to a storage system; and
   a storage manager, to:
   receive a signal indicating whether the host controller has failed; and
   perform, if the host controller fails, an operation to transfer control from the host controller to another host controller based on whether the command indicates that the data of the cache was stored to the storage system.

2. The expander of claim 1, wherein the communications manager is further to receive a signal indicating whether the host controller has failed.

3. The expander of claim 1, wherein the operation to transfer control includes an operation to zone storage of the storage system associated with the failed host controller to the other host controller.

4. The expander of claim 1, wherein the storage manager is further to maintain a cache state table having entries including an address of a host controller and a corresponding indication of the state of a cache associated with the host controller.

5. The expander of claim 1, wherein the storage manager is further to perform a discovery operation of host controllers on a SAS fabric and maintain a cache state table having entries identifying the host controllers and corresponding state of caches associated with the host controllers.

6. The expander of claim 1, wherein the command from the host controller indicates that the data in its cache was stored to the storage system.

7. The expander of claim 1, wherein the command from the host controller indicates that the data in its cache was not stored to the storage system.

8. A method of tracking host controller cache comprising:
receiving from a host controller a command indicating whether a cache of the host controller has data which is to be stored to a storage system; and
in the event that the host controller fails, determining, based on whether the command indicates that the data of the cache was stored to the storage system, whether to automatically perform an operation to transfer control from the host controller to another host controller, wherein the operation to transfer control is determined not to be automatically performed if the command indicates that the data of the cache was not stored to the storage system.

9. The method of claim 8, further comprising receiving a signal indicating whether the host controller has failed.

10. The method of claim 8, wherein performing the operation to transfer control includes performing an operation to zone storage of the storage system associated with the failed host controller to the other host controller.

11. The method of claim 8, further comprising maintaining a cache state table haying entries including an address of a host controller and a corresponding indication of the state of a cache associated with the host controller.

12. The method of claim 8, further comprising performing a discovery operation of host controllers on a SAS fabric and maintaining a cache state table having entries identifying the host controllers and corresponding state of caches associated with the host controllers.

13. The method of claim 8, wherein the command from the host controller indicates that the data in its cache was stored to the storage system.

14. The method of claim 8, wherein the command from the host controller indicates that the data in its cache was not stored to the storage system.

15. A non-transitory computer-readable medium having computer executable instructions stored thereon to track host controller cache, the instructions executable by a processor to:
receive from a host controller a command indicating whether a cache of the host controller has data which is to be stored to a storage system; and
in the event that the host controller fails, determine, based on whether the command indicates that the data of the cache was stored to the storage system, whether to automatically perform an operation to transfer control from the host controller to another host controller, wherein the operation to transfer control is determined not to be automatically performed if the command indicates that the data of the cache was not stored to the storage system.

16. The non-transitory computer-readable medium of claim 15 further comprising instructions that if executed cause a processor to:
receive a signal indicating whether the host controller has failed.

17. The non-transitory computer-readable medium of claim 15 further comprising instructions that if executed cause a processor to:
perform an operation to zone storage of the storage system associated with the failed host controller to the other host controller.

18. The non-transitory computer-readable medium of claim 15 further comprising instructions that if executed cause a processor to:
maintain a cache state table haying entries including an address of a host controller and a corresponding indication of the state of a cache associated with the host controller.

19. The non-transitory computer-readable medium of claim 15 further comprising instructions that if executed cause a processor to:
perform a discovery operation of host controllers on a SAS fabric and maintain a cache state table having entries identifying the host controllers and corresponding state of caches associated with the host controllers.

20. The non-transitory computer-readable medium of claim 15 further comprising instructions that if executed cause a processor to:
receive a command from the host controller that indicates that the data in its cache was stored to the storage system.

* * * * *

UNITED STATES PATENT AND TRADEMARK OFFICE
CERTIFICATE OF CORRECTION

PATENT NO. : 8,689,044 B2  
APPLICATION NO. : 13/298099  
DATED : April 1, 2014  
INVENTOR(S) : Balaji Natrajan et al.

Page 1 of 1

It is certified that error appears in the above-identified patent and that said Letters Patent is hereby corrected as shown below:

In the Claims

In column 8, line 49, in Claim 1, delete "manager," and insert -- manager --, therefor.

In column 9, line 33, in Claim 11, delete "haying" and insert -- having --, therefor.

In column 10, line 30, in Claim 18, delete "haying" and insert -- having --, therefor.

Signed and Sealed this  
Twelfth Day of August, 2014

Michelle K. Lee  
*Deputy Director of the United States Patent and Trademark Office*